United States Patent
Park et al.

(10) Patent No.: US 8,863,920 B2
(45) Date of Patent: Oct. 21, 2014

(54) ELECTRONIC PARKING BRAKE

(71) Applicant: Mando Corporation, Gyeonggi-do (KR)

(72) Inventors: Byung Ju Park, Gyeonggi-do (KR); Chang Bok Ko, Gyunggi-Do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 199 days.

(21) Appl. No.: 13/647,149

(22) Filed: Oct. 8, 2012

(65) Prior Publication Data
US 2013/0087422 A1  Apr. 11, 2013

(30) Foreign Application Priority Data
Oct. 7, 2011 (KR) .................. 10-2011-0102377

(51) Int. Cl.
| F16D 65/28 | (2006.01) |
| F16D 65/22 | (2006.01) |
| F16D 125/50 | (2012.01) |
| F16D 121/24 | (2012.01) |
| F16D 125/40 | (2012.01) |
| F16D 125/48 | (2012.01) |

(52) U.S. Cl.
CPC ............ *F16D 65/22* (2013.01); *F16D 2125/50* (2013.01); *F16D 2121/24* (2013.01); *F16D 2125/40* (2013.01); *F16D 2125/48* (2013.01)
USPC .......................................... 188/325; 188/156

(58) Field of Classification Search
USPC .................. 188/2 D, 156, 72.7, 72.8, 78, 325
See application file for complete search history.

(56) References Cited

U.S. PATENT DOCUMENTS

| 7,779,968 B2 * | 8/2010 | Noh ............................. 188/2 D |
| 8,235,181 B2 * | 8/2012 | Sano et al. ..................... 188/2 D |
| 8,408,367 B2 * | 4/2013 | Hofmann et al. ............. 188/72.9 |
| 2012/0234640 A1 * | 9/2012 | Jung et al. ..................... 188/325 |

FOREIGN PATENT DOCUMENTS

KR    10-2010-0043694 A    4/2010

* cited by examiner

Primary Examiner — Melanie Torres Williams
(74) Attorney, Agent, or Firm — McDermott Will & Emery LLP

(57) ABSTRACT

Disclosed herein is an electronic parking brake which is installed in a vehicle and is operated by a motor. The electronic parking brake having a drum rotating together with a wheel and first and second brake shoes includes a motor rotated in normal and reverse directions and generating driving force for braking, a cycloid reducer connected to a rotary shaft of the motor and amplifying the driving force generated from the motor, a spindle member connected to the cycloid reducer and rotated, a spur gear assembly rotated by rotary force transmitted from the spindle member, a piston rotated and provided with the outer circumferential surface on which one gear of the spur gear assembly is integrally formed, and a push rod unit installed at both ends of the piston in the longitudinal direction, rectilinearly moved according to rotation of the piston and supported by the first and second brake shoes.

8 Claims, 4 Drawing Sheets

ELECTRONIC PARKING BRAKE

CROSS-REFERENCE TO RELATED APPLICATION

This application claims the benefit of Korean Patent Application No. 2011-0102377, filed on Oct. 7, 2011 in the Korean Intellectual Property Office, the disclosure of which is incorporated herein by reference.

BACKGROUND

1. Field

Embodiments of the present invention relate to an electronic parking brake which is installed in a vehicle and is operated by a motor.

2. Description of the Related Art

In general, a brake installed in a vehicle serves to decelerate or stop a vehicle during driving or to maintain the stopped state of the vehicle, and changes kinetic energy into heat energy by means of a mechanical friction device during driving and thus performs braking operation.

Brakes are generally divided into a drum brake and a disc brake, and perform braking operation using hydraulic pressure.

Hereinafter, a drum brake will be described. The conventional drum brake includes a drum rotating together with a wheel of a vehicle, and first and second brake shoes installed within the drum and braking the drum through friction with the inner surface of the drum. Further, an actuating lever pushing both brake shoes to the inner surface of the drum when a parking cable connected to a parking lever of a driver's seat is pulled is provided in the drum. That is, in the conventional parking brake, since the parking cable is pulled by operation of the parking lever to apply pressure to the brake shoes, the brake shoes move in the braking direction to generate braking force.

However, such a conventional manual type parking brake may cause problems, such as inconvenience in that a driver needs to pull the parking lever by proper force, increase in the number of parts, such as an equalizer and a cable fixing device to install the parking cable, increase in man-hours for assembly, and lowering of utilization of an indoor space of a vehicle due to installation of the parking lever.

In order to solve these drawbacks of the manual type parking brake, an electronic parking brake which is automatically operated using a motor has been proposed. That is, Korean Patent Laid-open Publication No. 2000-0044704 discloses an electronic parking brake, and various research and development to achieve improvement of utilization of a space for installation of such a brake, the compact structure of the brake, and improvement of operating performance of the brake have been carried out.

CITED REFERENCE

Patent Document

Korean Patent Laid-open Publication No. 2000-0044704, pp. 2~3, FIGS. 3 and 4

SUMMARY

Therefore, it is an aspect of the present invention to provide an electronic parking brake which reduces rotating force generated from a motor, has a minimized length and improves a connection structure between respective parts so as to be more effectively and stably operated.

Additional aspects of the invention will be set forth in part in the description which follows and, in part, will be obvious from the description, or may be learned by practice of the invention.

In accordance with one aspect of the present invention, an electronic parking brake which has a drum rotating together with a wheel of a vehicle and first and second brake shoes installed at both sides of the inside of the drum to brake the drum, and pushes the first and second brake shoes to the inner surface of the drum to perform braking operation, includes a motor rotated in normal and reverse directions and generating driving force for braking, a cycloid reducer connected to a rotary shaft of the motor and amplifying the driving force generated from the motor, a spindle member connected to the cycloid reducer and rotated, a spur gear assembly rotated by rotary force transmitted from the spindle member, a piston rotated and provided with the outer circumferential surface on which one gear of the spur gear assembly is integrally formed, and a push rod unit installed at both ends of the piston in the longitudinal direction, rectilinearly moved according to rotation of the piston, and supported by the first and second brake shoes.

The spur gear assembly may include a driving gear connected to the spindle member and rotated together with the spindle member, a driven gear integrally formed on the outer circumferential surface of the piston, and a connection gear disposed between the driving gear and the driven gear and engaged with the driving gear and the driven gear.

The motor, the cycloid reducer, the spindle member and the driving gear may be coaxially connected in series.

The piston may be hollow in the longitudinal direction and a screw thread may be formed on the inner circumferential surface of one end of the piston, the push rod unit may include a first rod screw-connected to the screw thread formed on the inner circumferential surface of the end of the piston and supported by the first brake shoe and a second rod fitted to the inner circumferential surface of the other end of the piston and supported by the second brake shoe, the first rod may rectilinearly move according to rotation of the piston, and the second rod may rectilinearly move by reaction force generated due to movement of the first rod.

The cycloid reducer may include an eccentric rotator connected to the rotary shaft of the motor and eccentrically transmitting rotation of the rotary shaft, a cycloid gear provided with a plurality of through holes disposed in a radial direction from the center thereof and eccentrically rotated by the eccentric rotator, the eccentric rotator being installed at the center of the cycloid gear, an internal gear engaged with the outer surface of the cycloid gear and revolving and rotating the cycloid gear by rotation of the rotary shaft, and output shafts inserted into the plurality of through holes and compensating for the eccentric center of the cycloid gear.

The internal gear may be fixed to the motor so as not to be rotated, and a bearing may be installed between the cycloid gear and the eccentric rotator.

The spindle member may include a spindle shaft having a designated length, a driving gear connected to the outer circumferential surface of one end of the spindle shaft, and a flange part protruding from the other end of the spindle shaft and extending in the radial direction, and insertion holes may be formed on the flange part at positions corresponding to the plurality of through holes and be connected with the output shafts.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
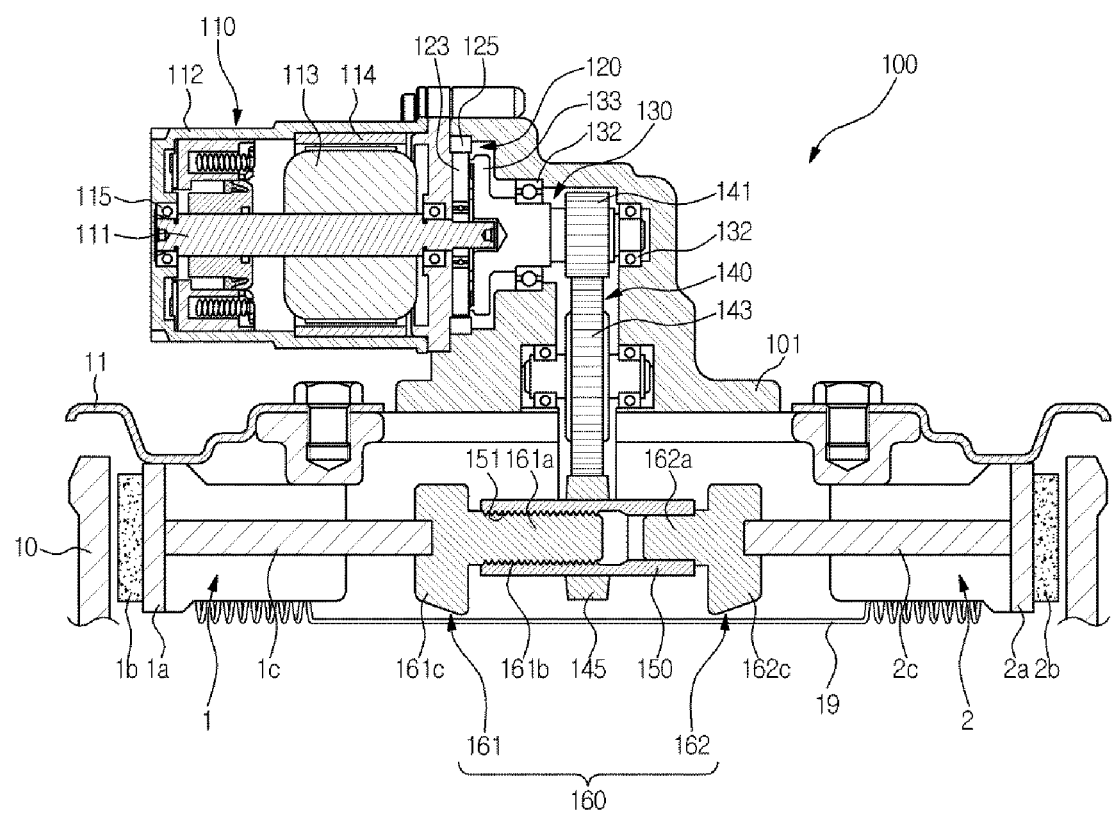
FIG. 1 is a longitudinal-sectional view schematically illustrating an electronic parking brake in accordance with one embodiment of the present invention.

Reference will now be made in detail to the embodiments of the present invention, examples of which are illustrated in the accompanying drawings, wherein like reference numerals refer to like elements throughout. The terms used in the following description are terms defined taking into consideration the functions obtained in accordance with the embodiments, and the definitions of these terms should be determined based on the overall content of this specification. Therefore, the configurations disclosed in the embodiments and the drawings of the present invention are only exemplary and do not encompass the full technical spirit of the invention, and thus it will be appreciated that the embodiments may be variously modified and changed.

Figure 2:
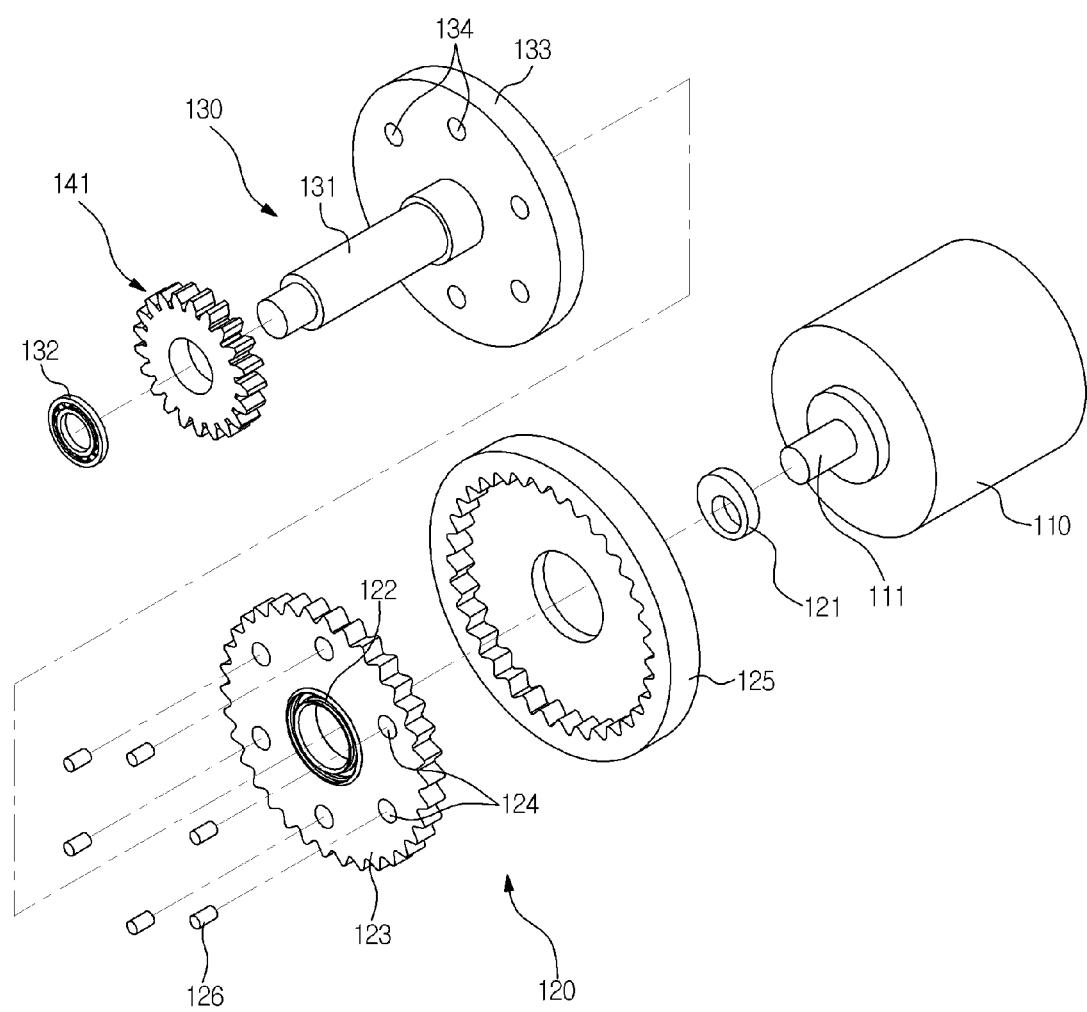
FIG. 2 is an exploded perspective view illustrating a motor, a cycloid reducer and a driving gear provided on the electronic parking brake in accordance with the embodiment of the present invention.

FIG. 1 is a longitudinal-sectional view schematically illustrating an electronic parking brake in accordance with one embodiment of the present invention, and FIG. 2 is an exploded perspective view illustrating a motor, a cycloid reducer and a driving gear provided on the electronic parking brake in accordance with the embodiment of the present invention.

With reference to FIGS. 1 and 2, the electronic parking brake 100 includes a cylindrical drum 10 rotating together with a wheel (not shown) of a vehicle, a pair of brake shoes 1 and 2 installed within the drum 10 so as to be opposite the inner circumferential surface of the drum 10 and braking the drum 10 through friction with the inner surface of the drum 10, a motor 110 generating driving force for braking, a cycloid reducer 120 connected to the motor 110, a spindle member 130 rotated by driving force amplified by the cycloid reducer 120, a spur gear assembly 140 rotated by rotating force transferred from the spindle member 130, a piston 150 rotated and provided with the outer circumferential surface with which one of gears of the spur gear assembly 140 is formed integrally, and a push rod unit 160 rectilinearly moving according to rotation of the piston 150 and pushing the pair of brake shoes 1 and 2 to the drum 10.

Each of the first and second brake shoes 1 and 2 includes a rim 1a or 2a bending in a semi-circular shape corresponding to the inner surface of the drum 10, a lining 1b or 2b attached to the outer surface of the rim 1a or 2a to perform friction with the inner surface of the drum 10, and a web 1c or 2c connected to the inner surface of the rim 1a or 2a to reinforce stiffness of the rim 1a or 2a. Such first and second brake shoes 1 and 2 are pressed to the inner circumferential surface of the drum 10 by the push rod unit 160 which will be described later, thereby generating braking force.

The motor 110 is provided with a rotary shaft 111 and generates driving force for braking. Although this embodiment illustrates the motor 110 as being installed on a back plate 11, the motor 110 may be installed on a vehicle frame (not shown). Such a motor 110 is connected to a control device (not shown) controlling the motor 110, and thus operation of the motor 110 is controlled by the control device. For example, the control device controls various operations of the motor 110, such as driving, stoppage, normal rotation and reverse rotation of the motor 110, through input signals transmitted according to driver's instructions. If brake operating instructions or brake releasing instructions given by a driver are applied to the control device, the control device rotates the motor 110 in a normal direction or the reverse direction. Further, the control device may include a load sensor (not shown) to detect intensity of force applied to the two brake shoes 1 and 2, and be configured to stop the motor 110 when force applied in response to a signal output from the load sensor is more than a designated intensity.

The motor 110 may be a well-known motor which is generally used. For example, the motor 110 includes a case 112, a rotor 113 provided within the case 112 and including a plurality of magnets mounted on a ring-shaped yoke and a rotary shaft 111 connected to the center of the rotor 113, a bearing 115 provided between the case 112 and the rotary shaft 111 to rotatably support the rotary shaft 111, and a stator 114 generating driving force to rotate the rotor 113.

The cycloid reducer 120 is connected to the rotary shaft 111 and serves to amplify driving force.

The cycloid reducer 120 includes an eccentric rotator 121 connected to the rotary shaft 111 of the motor 110 and eccentrically rotated, a cycloid gear 123 eccentrically rotated by the eccentric rotator 121, an internal gear 125 engaged with the outer surface of the cycloid gear 123 and revolving and rotating the cycloid gear 123, and output shafts 126 respectively inserted into a plurality of through holes 124 formed on the cycloid gear 123.

A hole into which the rotary shaft 111 of the motor 110 is inserted is eccentrically formed at the center of the eccentric rotator 121 so that the eccentric rotator 121 is eccentrically rotated.

The eccentric rotator 121 is installed at the center of the cycloid gear 123, and thus the cycloid gear 123 is eccentrically rotated. Here, a bearing 122 is provided between the cycloid gear 123 and the eccentric rotator 121.

The plurality of through holes 124 is formed on the cycloid gear 123 in a radial shape from the center of the cycloid gear 123. As shown in the drawings, six through holes 124 are formed on the cycloid gear 123 at regular intervals. Here, the number of the through holes 124 may be selectively increased and decreased according to the capacity of the parking brake 100, and the output shafts 126 causing the cycloid gear 123 to have the same eccentricity as the eccentric rotator 121 to compensate for the eccentric center of the cycloid gear 123 are inserted into the through holes 124.

The internal gear 125 is formed in the same cycloid curve as the tooth profile of the cycloid gear 123 so as to be engaged with the outer surface of the cycloid gear 123. The internal gear 125 is fixed to the motor 110 so that the cycloid gear 123 is revolved and rotated when the cycloid gear 123 is eccentrically rotated.

One end of the output shaft 126 is rotatably inserted into the through hole 124 of the cycloid gear 123, and the other end of the output shaft 126 is inserted into an insertion hole 134 of the spindle member 130 which will be described later. That is, the spindle member 130 is connected to the cycloid gear 123 by the output shafts 126, thus being rotated.

In such a cycloid reducer 120, when the eccentric rotator 121 connected to the rotary shaft 111 of the motor 110 is rotated, the cycloid gear 123 connected to the eccentric rotator 121 by the bearing 122 is revolved within the internal gear 125. Further, the cycloid gear 123 is rotated according to a difference between the number of teeth formed on the cycloid gear 123 and the number of teeth formed on the internal gear 125.

For example, if the eccentric rotator 121 revolves the cycloid gear 123 in the clockwise direction, although the cycloid gear 123 is revolved in the clockwise direction, the cycloid gear 123 engaged with the internal gear 125 is rotated in the counterclockwise direction along the inner surface of the internal gear 125.

That is, the rate of rotation of the cycloid gear 123 is an RPM which is reduced and output, and thus reduced speed is transmitted to the spindle member 130. Therefore, the output shafts 126 are connected to the through holes 124 of the cycloid gear 123, and thus shaking due to revolution may be compensated for and the spindle member 130 may be rotated collinearly with the rotary shaft 111 of the motor 110. That is, as the output shafts 126 cause rotating force transmitted from the cycloid gear 123 eccentrically rotated to synchronize with revolution of the cycloid gear 123, the spindle member 130 may be rotated collinearly with the rotary shaft 111 of the motor 110 by rotating force transmitted from the motor 110.

The electronic parking brake 100 in accordance with this embodiment of the present invention employing the above-described structure of the cycloid reducer 120 greatly increases a contact ratio between gears as compared to a conventional planetary gear assembly or a combination of spur gears and may thus obtain higher output torque. Further, the electronic parking brake 100 in accordance with this embodiment of the present invention has a reduced thickness and a reduced number of gear parts as compared to a gear assembly of planetary gears and may thus reduce the total length of the electronic parking brake 100.

The spindle member 130 includes a spindle shaft 131 having a designated length and a flange part 133 protruding from one end of the spindle shaft 131 and extending in the radial direction.

One gear 141 of the spur gear assembly 140 which will be described later is installed on the outer circumferential surface of the spindle shaft 131, and is rotated together with rotation of the spindle shaft 131.

The flange part 133 serves to connect the spindle member 130 directly to the cycloid reducer 120. Therefore, insertion holes 134 are formed on the flange part 133 at positions corresponding to the through holes 124, and are connected to the output shafts 126 installed on the cycloid gear 123. As the output shafts 126 cause rotating force transmitted from the cycloid gear 123 eccentrically rotated to synchronize with revolution of the cycloid gear 123, as described above, the spindle member 130 may be rotated collinearly with the rotary shaft 111 of the motor 110.

Here, non-described reference numeral '132' is a support bearing installed at the other end of the spindle shaft 131 to support the spindle member 130.

Figure 3:
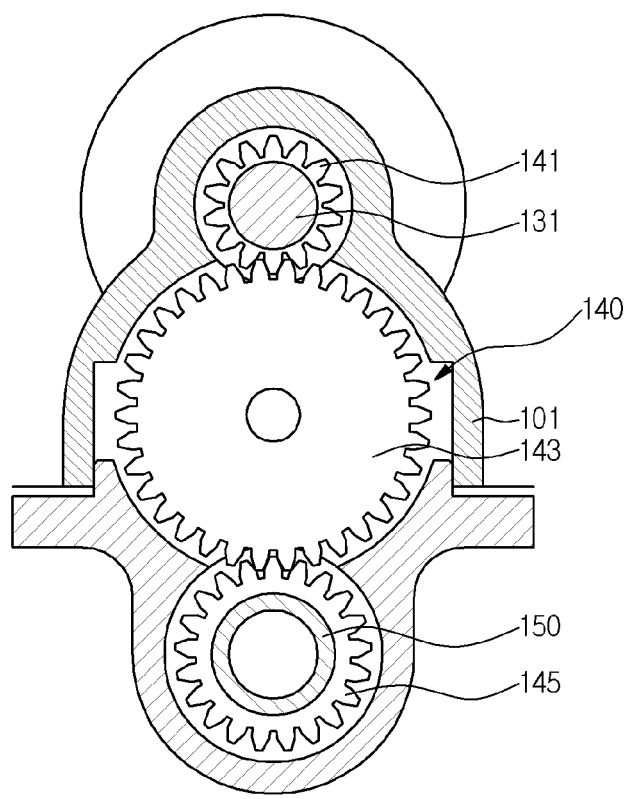
FIG. 3 is a view illustrating a spur gear assembly provided on the electronic parking brake in accordance with the embodiment of the present invention.

In accordance with the embodiment of the present invention, the spur gear assembly 140 in which a plurality of gears are engaged with each other serves to transmit rotating force. More specifically, with reference to FIG. 3, the spur gear assembly 140 includes a driving gear 141 installed on the spindle shaft 131 of the spindle member 130, a driven gear 145 installed on the outer circumferential surface of the piston 150 which will be described later, and a connection gear 143 disposed between the driving gear 141 and the driven gear 145 so as to be engaged with the driving gear 141 and the driven gear 145.

As described above, the driving gear 141 is fixed to the spindle shaft 131 and is rotated together with the spindle shaft 131, and the driven gear 145 is integrally formed on the outer circumferential surface of the piston 150 and is rotated together with the piston 150 by rotating force of the driving gear 141 transmitted from the connection gear 143. Although this embodiment of the present invention illustrates the spur gear assembly 140 as including three connected gears, embodiments of the present invention are not limited thereto. That is, the spur gear assembly 140 may include only the driving gear 141 and the driven gear 145 which are engaged with each other to transmit and receive rotating force therebetween.

The connection gear 143 and the driven gear 145 may have the same width. Further, the connection gear 143 and the driven gear 145 may have different widths. For example, the width of the driven gear 145 may be greater than the width of the connection gear 143. The reason for this is that the piston 150 moves to a designated distance by reaction force according to movement of the push rod unit 160 when the vehicle is braked using the electronic parking brake 100 in accordance with the embodiment of the present invention. That is, this serves to stably maintain engagement between the driven gear 145 and the connection gear 143 even if the piston 150 moves.

The piston 150 has a designated length and is hollow in the longitudinal direction, and the driven gear 145 is integrally provided on the outer circumferential surface of the piston 150. A screw thread 151 is formed on the inner circumferential surface of one end of the hollow piston 150. Here, the driven gear 145 may be located at the center of the piston 150.

The push rod unit 160 is installed at both ends of the hollow piston 150. The push rod unit 160 serves to press the two brake shoes 1 and 2 to the inner surface of the drum 10. The push rod unit 160 includes a first rod 161 screw-connected to the inner circumferential surface of one end of the piston 150, and a second rod 162 fitted to the inner circumferential surface of the other end of the piston 150.

The first rod 161 includes a first connection part 161a provided with a screw thread 161b on the outer circumferential surface thereof so as to be screw-connected to the screw thread 151 formed on the piston 150, and a first support part 161c formed at the end of the first connection part 161a. When the first connection part 161a of the first rod 161 is connected to the piston 150, the first support part 161c is supported by the web 1c of the first brake shoe 1. Thereby, as the piston 150 is rotated, the first rod 161, rotation of which is restricted by the first support part 161c, rectilinearly moves in the longitudinal direction of the piston 150 and presses the first brake shoe 1 (with reference to FIG. 4).

The second rod 162 includes a second connection part 162a connected to the inner circumferential surface the end of the piston 150 opposite to the end of the piston 150 to which the first rod 161 is connected, and a second support part 162c formed at the end of the second connection part 162a. In the same manner as the first rod 161, when the second connection part 162a of the second rod 162 is connected to the piston 150, the second support part 162c is supported by the web 2c of the second brake shoe 2. The second rod 162 presses the second brake shoe 2 by reaction force generated by operation of the first rod 161, pressing the first brake shoe 1 according to rotation of the piston 150, and the piston 150.

Figure 4:
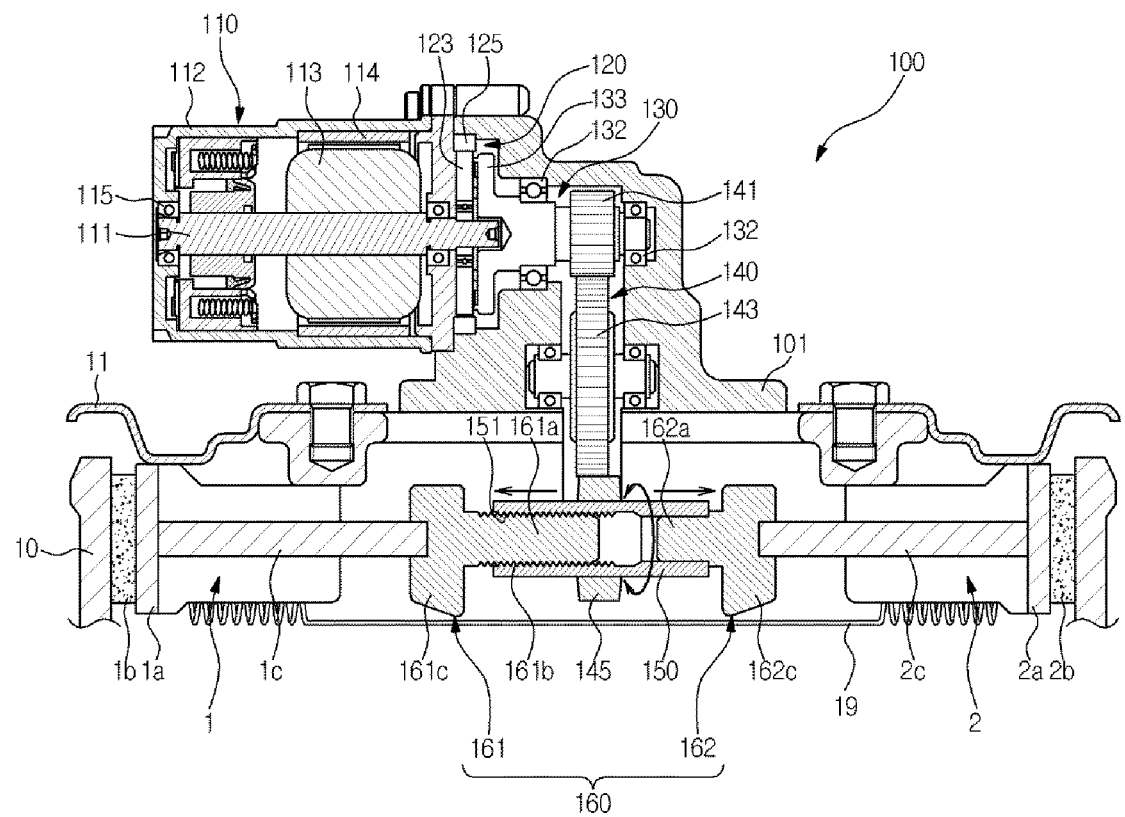
FIG. 4 is a view illustrating the electronic parking brake in accordance with the embodiment of the present invention in a braked state.

Therefore, when such a push rod unit 160 presses the two brake shoes 1 and 2 to the inner surface of the drum 10 by the piston 150 having received rotating force, the push rod unit 160 rectilinearly moves under the condition that the first and second support parts 161c and 162c of the first and second rods 161 and 162 are supported by the webs 1c and 2c, as shown in FIG. 4. That is, friction between the drum 10 and the linings 1b and 2b of the respective brake shoes 1 and 2 is generated, thereby performing braking.

The brake shoes 1 and 2 may be easily pressed through the structures of the piston 150 and the push rod unit 160 which convert rotating movement to rectilinear movement. Further, since the spindle member 130 and the driving gear 141 connected to the cycloid reducer 120 in series directly generate and receive braking force, high speed reduction may be achieved and the length of an actuator of the electronic parking brake 100 may be minimized.

Although this embodiment of the present invention illustrates the second rod 162 of the electronic parking brake 100 as being operated by reaction force generated by operation of the first rod 161 and the piston 150, embodiments of the present invention are not limited thereto and the second rod 162 may be screw-connected to the piston 150 to perform braking operation in the same manner as the first rod 161.

Here, non-described reference numeral 19 is a return spring to restore the two brake shoes 1 and 2 to their original positions when braking operation is released, and non-described reference numeral 101 is a housing installed on the back plate 11 to fix the motor 110 and surrounding the cycloid reducer 120, the spindle member 130 and the spur gear assembly 140.

Hereinafter, braking operation of the above-described electronic parking brake 100 will be described.

First, when a driver of a vehicle presses a control device (not shown), for example, a parking switch (not shown) under the condition that the two brake shoes 1 and 2 are separated from the inner surface of the drum 10 (braking is released), the motor 110 is rotated according to a signal from the control device and thus generates driving force. That is, the cycloid reducer 120 having received rotating force from the motor 120 is eccentrically rotated to achieve speed reduction, and transmits the rotating force to the spindle member 130 connected to the cycloid reducer 120. Then, when the piston 150 is rotated by the rotating force transmitted from the spur gear assembly 140 having the driving gear 141 installed on the spindle member 130, the push rod unit 160 rectilinearly moves and presses the two brake shoes 1 and 2 to the inner surface of the drum 10, as shown in FIG. 4. That is, the first rod 161 of the push rod unit 160 which is screw-connected to the piston 150 and supported by the first brake shoe 1, rectilinearly moves, and the second rod 162 presses the second brake shoe 2 by reaction force. Here, the second rod 162 moves together with the piston 150, and the driven gear 145 formed on the outer circumferential surface of the piston 150 and the connection gear 143 engaged with the driven gear 145 have different widths so that stable engagement between the driven gear 145 and the connection gear 143 may be maintained even if the piston 150 moves.

On the other hand, when braking force is released, the motor 110 is rotated in the opposite direction to the direction during braking. Then, the cycloid reducer 120, the spindle member 130, the spur gear assembly 140 and the piston 150 are rotated and the push rod unit 160 is moved to its original state. As the push rod unit 160 is restored to its original state, a pair of brake shoes 1 and 2 is moved to their original positions.

The two brake shoes 1 and 2 are efficiently separated from the inner surface of the drum 10 by elasticity of the return spring 19, thus being restored to their original positions.

As is apparent from the above description, an electronic parking brake in accordance with one embodiment of the present invention is conveniently used through braking using a motor, achieves high speed reduction using a cycloid reducer, and minimizes the total length through connection of the motor, the cycloid reducer and a spindle member in series, thereby providing a compact connection structure and improving space utilization.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic parking brake which has a drum rotating together with a wheel of a vehicle and first and second brake shoes installed at both sides of the inside of the drum to brake the drum, and pushes the first and second brake shoes to the inner surface of the drum to perform braking operation, the electronic parking brake comprising:
   a motor rotated in normal and reverse directions and generating driving force for braking;
   a cycloid reducer connected to a rotary shaft of the motor and amplifying the driving force generated from the motor;
   a spindle member connected to the cycloid reducer and rotated;
   a spur gear assembly rotated by rotary force transmitted from the spindle member;
   a piston rotated and provided with the outer circumferential surface on which one gear of the spur gear assembly is integrally formed; and
   a push rod unit installed at both ends of the piston in the longitudinal direction, rectilinearly moved according to rotation of the piston, and supported by the first and second brake shoes.

2. The electronic parking brake according to claim 1, wherein the spur gear assembly includes:
   a driving gear connected to the spindle member and rotated together with the spindle member;
   a driven gear integrally formed on the outer circumferential surface of the piston; and
   a connection gear disposed between the driving gear and the driven gear and engaged with the driving gear and the driven gear.

3. The electronic parking brake according to claim 2, wherein the motor, the cycloid reducer, the spindle member and the driving gear are coaxially connected in series.

4. The electronic parking brake according to claim 1, wherein:
   the piston is hollow in the longitudinal direction and a screw thread is formed on the inner circumferential surface of one end of the piston; and
   the push rod unit includes a first rod screw-connected to the screw thread formed on the inner circumferential surface of the end of the piston and supported by the first brake shoe, and a second rod fitted to the inner circumferential surface of the other end of the piston and supported by the second brake shoe,
   wherein the first rod rectilinearly moves according to rotation of the piston, and the second rod rectilinearly moves by reaction force generated due to movement of the first rod.

5. The electronic parking brake according to claim 1, wherein the cycloid reducer includes:
   an eccentric rotator connected to the rotary shaft of the motor and eccentrically transmitting rotation of the rotary shaft;
   a cycloid gear provided with a plurality of through holes disposed in a radial direction from the center thereof and eccentrically rotated by the eccentric rotator, the eccentric rotator being installed at the center of the cycloid gear;

an internal gear engaged with the outer surface of the cycloid gear and revolving and rotating the cycloid gear by rotation of the rotary shaft; and output shafts inserted into the plurality of through holes and compensating for the eccentric center of the cycloid gear.

6. The electronic parking brake according to claim 5, wherein the internal gear is fixed to the motor so as not to be rotated.

7. The electronic parking brake according to claim 5, wherein a bearing is installed between the cycloid gear and the eccentric rotator.

8. The electronic parking brake according to claim 5, wherein the spindle member includes:

a spindle shaft having a designated length, a driving gear connected to the outer circumferential surface of one end of the spindle shaft; and a flange part protruding from the other end of the spindle shaft and extending in the radial direction; and insertion holes are formed on the flange part at positions corresponding to the plurality of through holes and are connected with the output shafts.

* * * * *